(12) United States Patent
Uezono

(10) Patent No.: US 7,705,892 B2
(45) Date of Patent: Apr. 27, 2010

(54) AUTO WHITE BALANCE APPARATUS AND WHITE BALANCE ADJUSTING METHOD

(75) Inventor: Tetsuji Uezono, Kanagawa (JP)

(73) Assignee: Eastman Kodak Company, Rochester, NY (US)

( * ) Notice: Subject to any disclaimer, the term of this patent is extended or adjusted under 35 U.S.C. 154(b) by 1223 days.

(21) Appl. No.: 11/256,530

(22) Filed: Oct. 21, 2005

(65) Prior Publication Data

US 2006/0159336 A1 Jul. 20, 2006

(30) Foreign Application Priority Data

Jan. 19, 2005 (JP) .............................. 2005-011109

(51) Int. Cl.
*H04N 9/73* (2006.01)
*G06K 9/00* (2006.01)

(52) U.S. Cl. .................................... 348/223.1; 382/167
(58) Field of Classification Search ............. 348/224.1, 348/225.1, 221.1, 655; 358/516
See application file for complete search history.

(56) References Cited

U.S. PATENT DOCUMENTS

| | | | | |
|---|---|---|---|---|
| 5,278,641 | A | * | 1/1994 | Sekizawa et al. ............ 358/527 |
| 6,791,606 | B1 | * | 9/2004 | Miyano .................... 348/223.1 |
| 7,126,644 | B2 | * | 10/2006 | Xia et al. ..................... 348/655 |
| 7,265,781 | B2 | * | 9/2007 | Noguchi ................... 348/223.1 |
| 7,394,930 | B2 | * | 7/2008 | Trimeche et al. ............ 382/167 |

FOREIGN PATENT DOCUMENTS

| | | |
|---|---|---|
| JP | 5007369 | 1/1993 |
| JP | 5292533 | 11/1993 |
| JP | 8289314 | 11/1996 |
| JP | 2000092509 | 1/2000 |

* cited by examiner

*Primary Examiner*—Luong T Nguyen
(74) *Attorney, Agent, or Firm*—Pamela R. Crocker

(57) ABSTRACT

To provide an auto white balance apparatus and a white balance adjusting method capable of performing more stable white balance adjustment. For every block, a characteristic pixel determination circuit 106 determines a characteristic pixel from among a pixel group in a block and a light-source reflection determination circuit 108 determines whether the typical value of a block reflects the light source of an input image, by comparing the color difference of a characteristic pixel of the block with the typical color difference of the block. Then, as a result of the determination, a white balance evaluating circuit 110 determines the light source of an image by using blocks that reflect the light source.

10 Claims, 13 Drawing Sheets

AUTO WHITE BALANCE APPARATUS AND WHITE BALANCE ADJUSTING METHOD

FIELD OF THE INVENTION

The present invention relates to an auto white balance apparatus and white balance adjusting method used for an electronic still camera or a video camera.

BACKGROUND OF THE INVENTION

During use of a video camera or a digital still camera, auto white balance adjustment is performed in order to reproduce a white object as white. In a well-known, conventional auto balance method, the balance of RGB components (three primary color components of red, green, and blue) of signals for each pixel is adjusted so that the average of the whole image becomes achromatic. However, this method has a disadvantage in that white balance adjustment tends to be performed incorrectly when chromatic color occupies the greater portion of an image.

Such incorrect white balance adjustment is referred to as color failure. The technique disclosed in Japanese Application Hei 5-292533 is known as an auto white balance adjusting method for reducing color failure. In the case of this technique, an image is divided into a plurality of blocks, the average value of RGB of each block is calculated, and only a block in which the average value falls within a predetermined range is extracted. Then, each component of RGB is adjusted so that the average value of RGB of the extracted block group becomes achromatic.

Moreover, Japanese Application Hei 5-7369 discloses another auto white balance method for reducing color failure. In this method, the range of values which can be assumed by a white balance adjustment signal is restricted, so as to avoid performance of excessive white balance adjustment.

Although these methods yield advantages when a light source for illuminating an object is restricted, sufficient white balance adjustment is impossible when an object is illuminated by an unexpected light source or a plurality of types of light sources simultaneously.

Therefore, in Japanese Application. Hei 8-289314 the present applicant has proposed an improved auto white balance adjusting apparatus. This apparatus extracts a block group determined to be the result of dividing an image into a plurality of blocks and photographing a white object under a fluorescent lamp, a block group determined to be the result of photographing a white object under sunlight or tungsten light, and a block group having a color close to the brightest block in an image. Then, average values of RGB components of these block groups are obtained, and a value obtained by mixing the average values in accordance with a predetermined rule is used as a white balance adjustment signal. This apparatus can perform proper white balance adjustment even in the case where the an object is illuminated by an unexpected light source or a plurality of types of light sources, by reflecting in a white balance signal the average value of RGB of a block group having a color approximating that of the brightest block in an image.

However, in the case of the method disclosed in Patent Document 3, because the above block groups are extracted in accordance with only color, the value of a dark block is used when obtaining the average values of each block group. A color appearing as an image is influenced by the color of an object and the color of a light source for illuminating the object. In this case, because the dark block has a high probability of not reflecting the color of the light source, reflecting the information of the dark block on an auto white balance adjustment signal may lead to an error.

Therefore, in Japanese Application 2000-92509 the present applicant has proposed a further-improved auto white balance adjusting apparatus. In this apparatus, the average value of RGB components obtained for each block obtained by dividing an image is used as the typical value of blocks; a block having the highest luminance is obtained in accordance with the typical value; and a luminance threshold value is obtained in accordance with the luminance of the highest-luminance block. Then, white balance adjustment is performed in accordance with the typical value of blocks each having luminance higher than the luminance threshold value among all blocks.

SUMMARY OF THE INVENTION

In the above methods, the average value of RGB components of each block is simply determined as the typical value of blocks for performing white balance. Therefore, when a chromatic color is present in each block or when values of RGB in the block are not uniform, these colors are mixed and the average value of blocks does not reflect the color of a light source illuminating each block, possibly leading to failure to properly apply white balance adjustment to an input image.

Therefore, an object of the present invention is to provide an auto white balance apparatus and a white balance adjusting method capable of performing stable white balance adjustment even if a chromatic color is present in each block or if values of RGB in a block are not uniform.

An auto white balance apparatus of the present invention includes block-dividing means for dividing an input image into a plurality of blocks; typical-value calculating means for calculating, for every block, a typical value including the luminance and color difference the block in accordance with each color value in the block; characteristic pixel determination means for determining, for each block, a characteristic pixel from a pixel group constituting the block; light-source reflection-determination means for determining whether the typical value of the blocks indicates reflection of the light source of the input image every block, by comparing the typical color difference of a block with the color difference of a characteristic pixel of the block; white balance evaluating means for estimating the color of the light source of the input image in accordance with the typical luminance of blocks determined by the light-source reflection determination means to reflect the light source and the object luminance of the input image; white balance gain calculating means for calculating a white balance gain to be applied to the image in accordance with the color of the estimated light source; and white balance adjusting means for performing white balance adjustment for the image by use of the calculated white balance gain.

According to the present invention, because characteristic pixel determination means determines a characteristic pixel from a pixel group in a block and light-source reflection determination means compares the color difference of the characteristic pixel of the block with the typical color difference of the block, a determination is made, for every block, as to whether the typical value of the block indicates reflection of the light source of an input image. Then, as a result of the determination, only blocks determined to reflect the light source are used for determining the light source of the image. Therefore, a light source can be estimated more accurately in accordance with the typical value of blocks and more-stable white balance adjustment can be performed.

In this case, a pixel determined to be a characteristic pixel by characteristic pixel determination means is a pixel having the highest luminance or a pixel having the largest color difference among a pixel group constituting a block. Moreover, light-source reflection determination means determines that the typical value of a block indicates reflection of the color of a light source when a pixel having the highest luminance is a characteristic pixel and conditions of $\cos\theta > \alpha$ ($\alpha$:constant) and $\beta_1 < R < \beta_2$ ($\beta_1$ and $\beta_2$ are constants) are satisfied. Light-source reflection determination means determines that the typical value of a block does not reflect the color of a light source when a pixel having the largest color difference is a characteristic pixel and conditions of $\cos\theta > \alpha$ ($\alpha$:constant) and $\beta_3 < R < \beta_4$ ($\beta_3$ and $\beta_4$ are constants) are satisfied.

DETAILED DESCRIPTION OF THE INVENTION

An embodiment of the present invention will now bw described by reference to the accompanying drawings.

Figure 1:
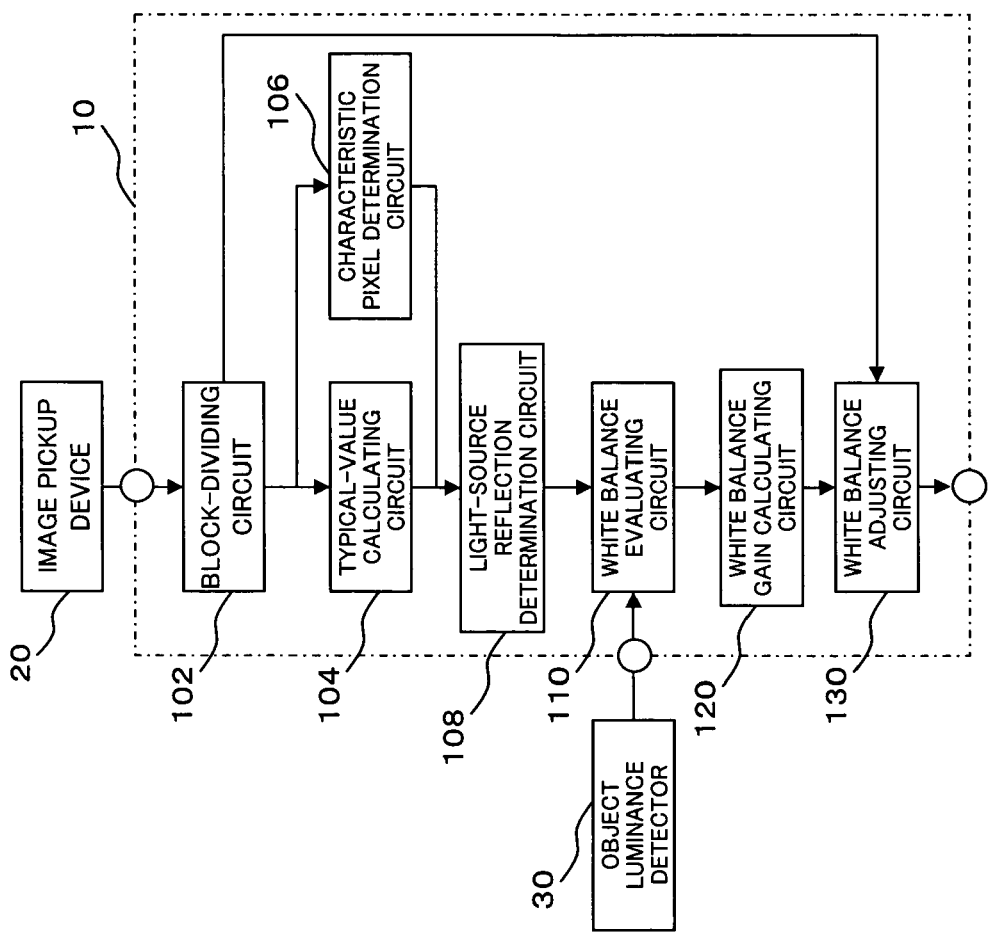
FIG. 1 is a functional block diagram showing a configuration of the auto white balance apparatus of an embodiment of the present invention.

FIG. 1 is a functional block diagram showing the configuration of the auto white balance apparatus 10 of the embodiment. The auto white balance apparatus 10 is typically built into a camera such as an electronic still camera or a video camera. The auto white balance apparatus 10 calculates a gain for white balance adjustment from an image input from an image pickup device 20 of a camera, and adjusts white balance for the input image in accordance with the gain.

The white balance apparatus of the embodiment divides an input image into a plurality of blocks, calculates the average value of each color value (R, G, and B) within every block, and calculates luminance (L) and color difference (u, v) values representing the blocks. Moreover, in the embodiment the color of the light source of the input image is estimated in accordance with the calculated typical luminance of each block, and white balance adjustment is performed in accordance with the estimation result. In the embodiment, the color of the light source of an input image is estimated by using only blocks in which the typical luminance and typical color difference indicate reflection of the color of a light source. That is, image data, typical luminance, and typical color difference selected by a light-source reflection determination circuit 108 are input to a white balance evaluating circuit 110 in accordance with a characteristic pixel detected by a characteristic pixel determination circuit 106 to be described below, and the light source of the input image is estimated.

Figure 2:
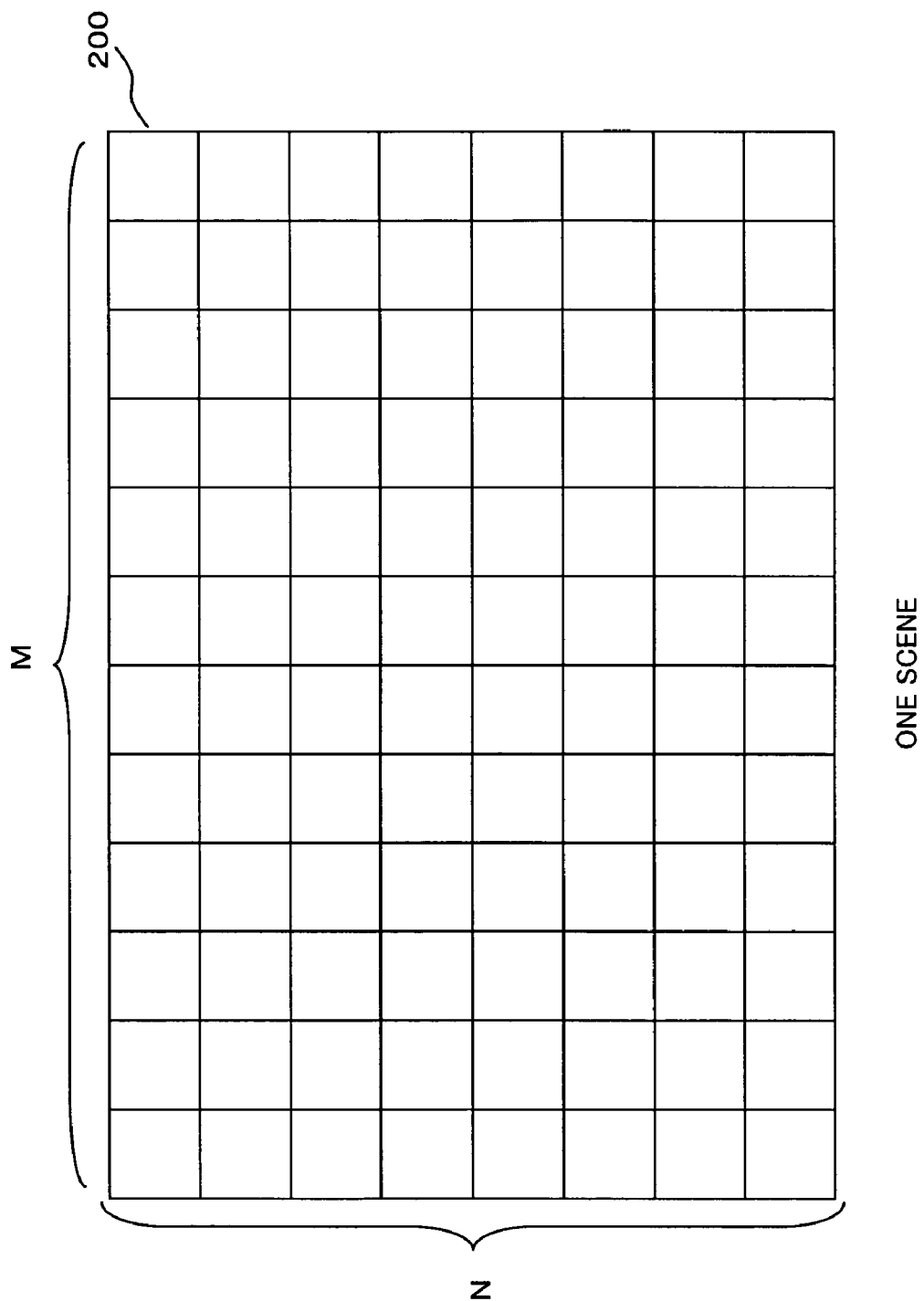
FIG. 2 is an illustration showing an example of block division of an input image in the present embodiment.
Figure 3:
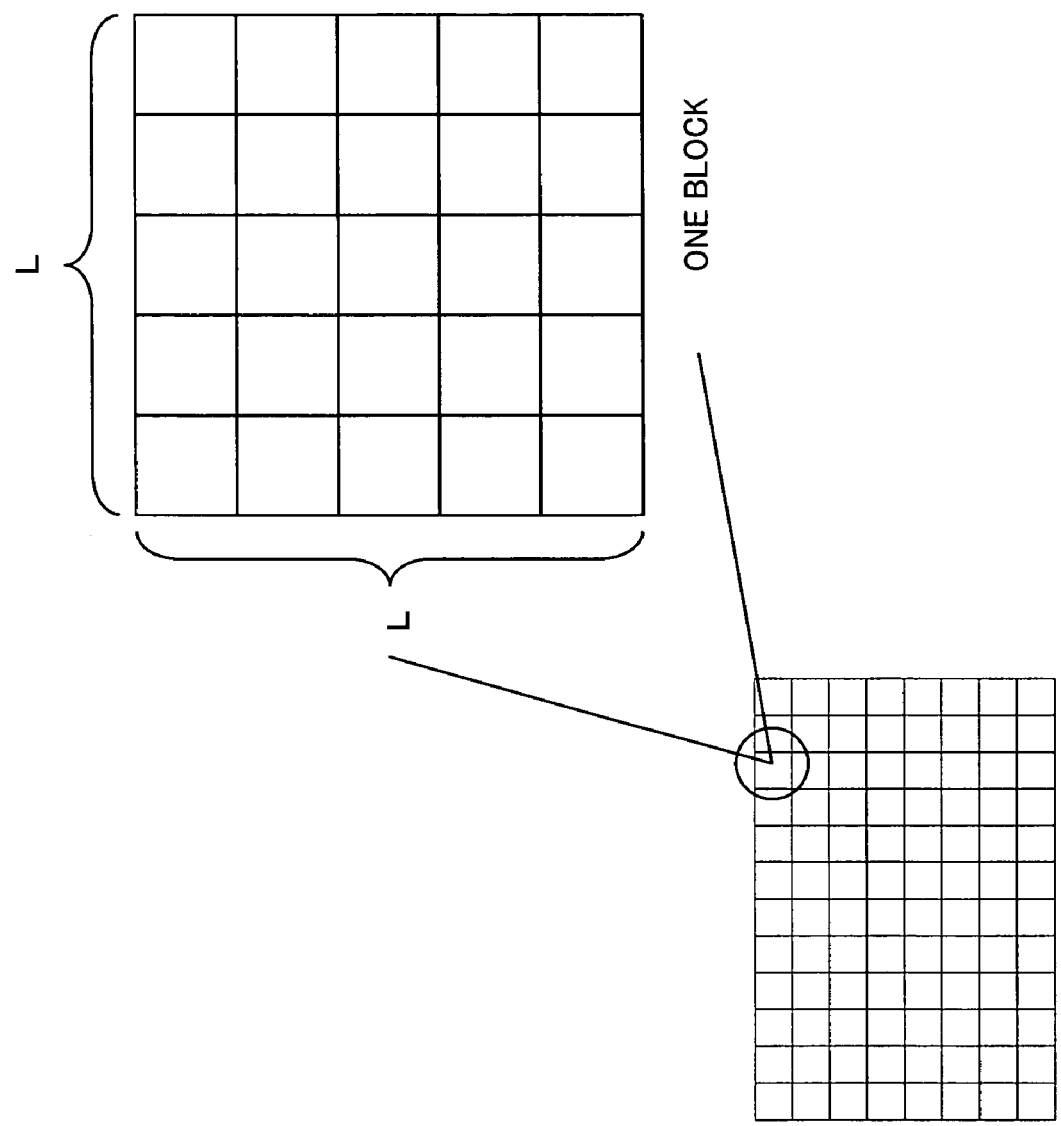
FIG. 3 is an illustration showing an example of a block employed in the embodiment.

Various portions of this apparatus are described below in detail. A block-dividing circuit 102 divides an image signal output from the image pickup device 20 into blocks constituted of a predetermined pixel unit. FIG. 2 shows an example of block division of an image. In the case of this example, an image 200 for one frame is divided into M×N blocks. FIG. 3 shows an example of a pixel layout of each block; each block is constituted of L×L pixels. The block divisions shown in FIGS. 2 and 3 are merely examples; a dividing method other than that described above may be employed. Image data of each block divided by the block-dividing circuit 102 are input to a typical-value calculating circuit 104, the characteristic pixel determination circuit 106, and a white balance adjusting circuit 130.

For every block, the typical-value calculating circuit 104 calculates the luminance and color difference representing characteristics of an average color of the block. In the embodiment, the luminance and color difference are referred to as typical luminance and typical color difference, and the luminance and color difference serving as the typical luminance and typical color difference are referred to as typical values. A method for calculating the typical luminance and typical color difference is described below.

The typical-value calculating circuit 104 first obtains the average value of all pixel values of one block. For example, when an image signal of the image pickup device 20 is represented by RGB (red, green, and blue), the typical-value calculating circuit 104 averages RGB values of each pixel for RGB components on all pixels within the block. Then, the typical-value calculating circuit 104 subjects the average values to linear conversion of luminance (L) and a set (L, u, v) of two color difference components (u, v). The conversion formula is shown by the following expression.

$$\begin{pmatrix} L \\ u \\ v \end{pmatrix} = \begin{pmatrix} 1/4 & 1/2 & 1/4 \\ -1/4 & 1/2 & -1/4 \\ -1/2 & 0 & 1/2 \end{pmatrix} \begin{pmatrix} R \\ G \\ B \end{pmatrix} \quad (1)$$

A conversion matrix used for conversion depends on the input characteristic of the image pickup device 20, and the conversion matrix shown in Expression (1) is only an example. Moreover, when an image signal is represented by a color system other than RGB, luminance and color difference component may be obtained by use of a conversion matrix corresponding to the color system. To obtain the typical luminance and typical color difference of a block, the above processing is performed by calculating the average of RGB of all pixels constituting the block. Alternatively, there may be employed a configuration in which the average of pixels extracted from a block are used in accordance with a predetermined sampling rule.

The above processing is performed every block constituting one image and the typical luminance and typical color difference (L1, u1, v1) of each obtained block are input to the light-source reflection determination circuit 108.

The characteristic pixel determination circuit 106 detects, for each block, a characteristic pixel from among a pixel group constituting the block. In this case, a characteristic pixel denotes a pixel serving as a reference for determining whether a typical value shows a color close to the color of a light source. In the embodiment, a pixel having the maximum luminance (L0) or a pixel having the maximum color difference (u0, v0) within a pixel group; that is, a pixel having the maximum value of:

$$\sqrt{u^2+v^2}$$

is defined as a characteristic pixel. Moreover, the characteristic pixel determination circuit 106 first calculates the luminance (L) and color difference (u, v) in accordance with expression 1 for all pixels constituting a block. Then, the circuit 106 extracts from among the pixels a pixel having the maximum luminance (L0) or a pixel having the maximum color difference (u0, v0).

Because a pixel having a high luminance generally tends to reflect the color of a light source, a pixel having the maximum luminance has a high probability of being achromatic, as well as a high probability of being close to the color of the light source. However, because a pixel having a large color difference tends to reflect the color of an object of an input image, a pixel having the maximum color difference has a high probability of being close to the color of an object and a high probability of not being a pixel close to the color of the light source. Therefore, on the basis of the characteristic pixel, the present embodiment determines whether a typical value reflects the color of a light source. The present embodiment detects as a characteristic pixel a pixel having the maximum luminance or maximum color difference. However, it may be the case that only a pixel satisfying either condition is defined as a characteristic pixel.

Figure 4:
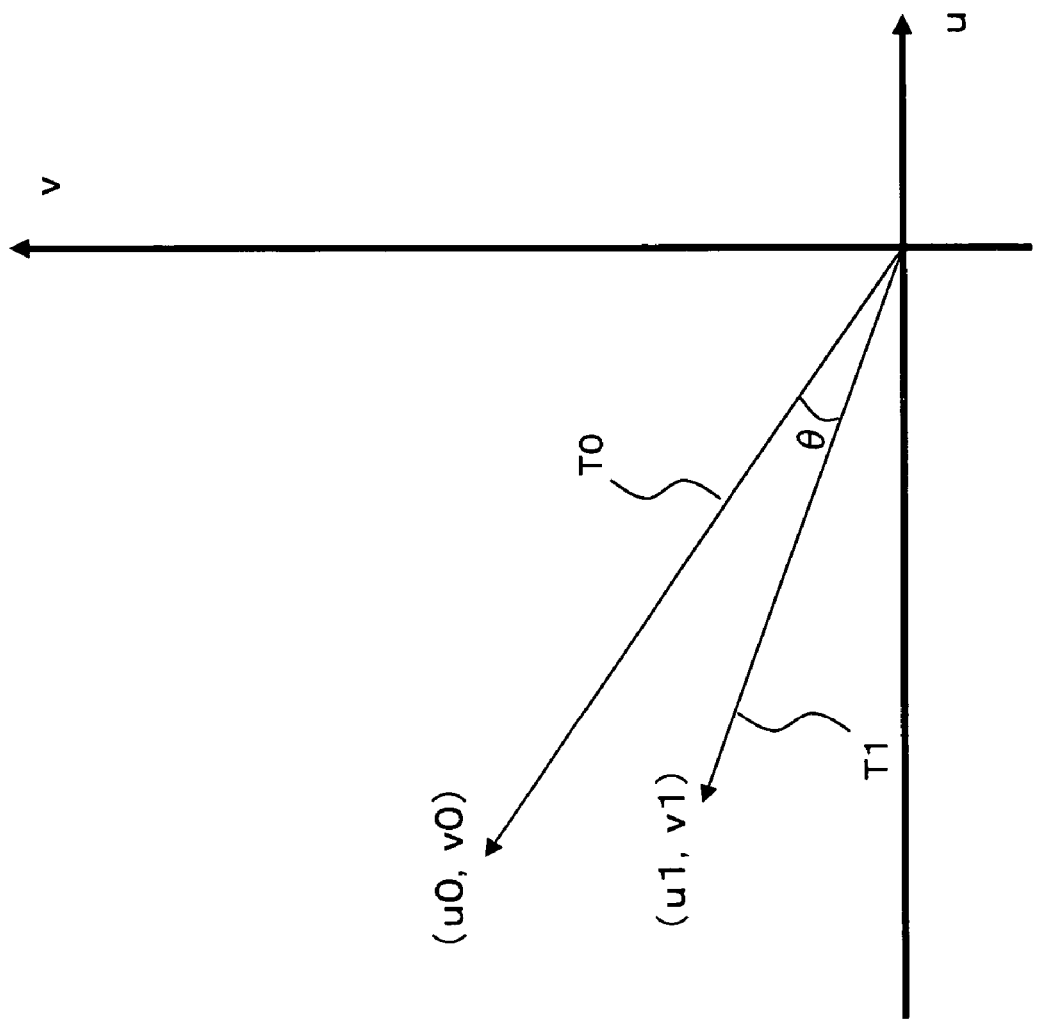
FIG. 4 is an illustration showing an example of a color difference space used when a light-source reflection determination circuit determines whether the typical value of each block indicates reflection of the color of a light source in the embodiment.

The light-source reflection determination circuit 108 determines whether the typical luminance and color difference of each block obtained by the typical-value calculating circuit 104 reflects the color of a light source, by comparing the color difference (u0, v0) of the characteristic pixel extracted by the characteristic pixel determination circuit 106 with the typical color difference (u1, v1) corresponding to the characteristic pixel, and outputs to the white balance evaluating circuit only data for a block which reflects the color of the light source. Specifically, as shown in FIG. 4, in accordance with the conditional expression shown below, the circuit 108 determines whether the color of a light source is reflected, by vector-expressing the color difference (u0, v0) and typical color difference (u1, v1) of a characteristic pixel on a (u, v) plane (color difference space) in accordance with the angle θ formed between a vector T0 and a vector T1 and a scalar ratio R between the vector T0 and the vector T1.

When detecting as a characteristic pixel a pixel having the maximum luminance (L), the typical luminance and typical color difference of the block are determined to reflect the color of the light source of the block when the condition of $$\cos\theta > \alpha$$

and $$\beta_1 < R < \beta_2$$

is satisfied. However, when the above conditional expression is not satisfied, a determination is made that the typical luminance and typical color difference of the block do not reflect the color of the light source.

When a pixel having the maximum color difference (u, v) is determined to be a characteristic pixel, the typical luminance and typical color difference of the block are determined not to reflect the color of the light source of the block when the condition of $$\cos\theta > \alpha$$

and $$\beta_3 < R < \beta_4$$

is satisfied. However, when the above condition is not satisfied, a determination is made that the typical luminance and typical color difference of the block reflect the color of the light source of the block.

Greek letters α and $\beta_1$ to $\beta_4$ denote constants previously obtained from an experiment. For example, α is set to 0.9, $\beta_1$ is set to 0.8, $\beta_2$ is set to 1.2, $\beta_3$ is set to 0.8, and $\beta_4$ is set to 1.2.

Thus, the light-source reflection determination circuit 108 determines whether the typical luminance and typical color difference of each block obtained by the typical value calculating circuit 104 reflect the color of a light source, but the circuit 108 cancels the image data determined not to reflect the color of the light source. Then, the data (image data, typical luminance, and typical color difference) for a block determined to reflect the color of a light source by the light-source reflection determination circuit 108 are input to the white balance evaluating circuit 110. Hereafter, the identification number of a block is taken as i (i=1, 2, ..., n: n is the total number of blocks of the image) and the typical luminance and typical color difference of the i-th block are shown as (Li, ui, vi).

Thus, in the present embodiment, the typical luminance and typical color difference of a block input to the white balance evaluating circuit 110 are only the typical luminance and typical color difference of a block determined to reflect the color of a light source by the light-source reflection determination circuit 108. Therefore, a light source can be more accurately estimated in accordance with the typical luminance and typical color difference of the block, and more stable white balance adjustment can be performed.

The white balance evaluating circuit 110 receives the data (image data, typical luminance, and typical color difference) for a block determined to reflect the color of a light source by the light-source reflection determining circuit 108, and estimates the light source of an input image in accordance with these data values.

A white balance gain calculating circuit 120 calculates a white balance gain to be applied to an input image in accordance with the estimated color of a light source.

The white balance adjusting circuit 130 adjusts white balance for an input image in accordance with a calculated white balance gain.

The white balance evaluating circuit 110, white balance gain calculating circuit 120, and white balance adjusting circuit 130 are described in more detail below.

Figure 5:
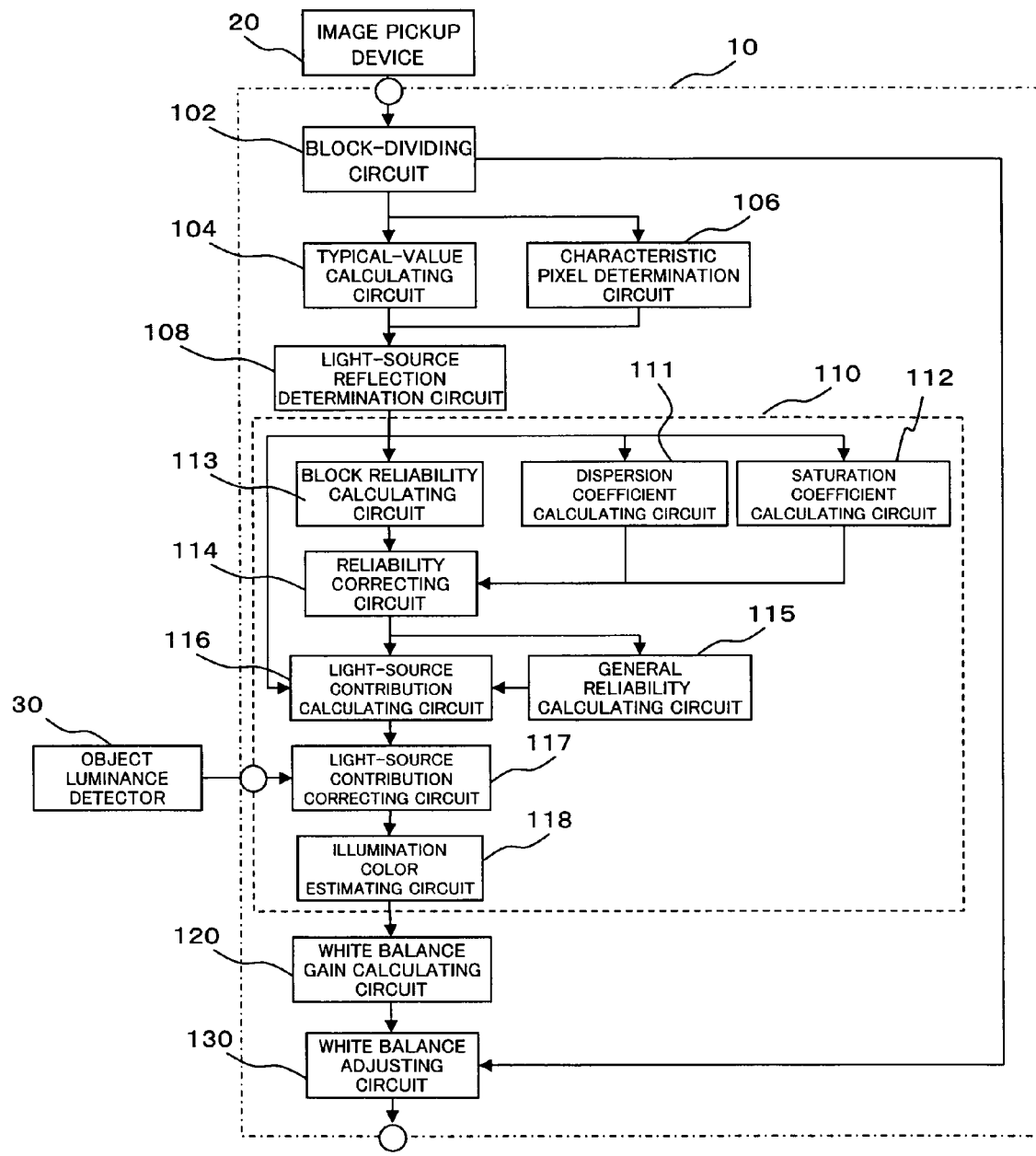
FIG. 5 is a functional block diagram showing in greater detail a configuration of the auto white balance apparatus in the embodiment.

FIG. 5 is a functional block diagram showing a configuration of the auto white balance apparatus 10 of the present embodiment, which is a functional block diagram showing the white balance evaluating circuit 110 in more detail. The processing procedure described below is merely an example;

another processing procedure may be used, so long as the procedure estimates the light source of an input image in accordance with the typical luminance and typical color difference of a block and adjusts white balance in accordance with the estimation result.

A dispersion coefficient calculating circuit 111 receives image data of each block for which the light-source reflection determination circuit 108 has determined that typical values reflect the color of a light source, and obtains dispersion coefficients Cv of the blocks. Each of the dispersion coefficients Cv is a coefficient for correcting a block reliability to be described later and is determined in accordance with dispersion of pixel values of the block. The dispersion coefficient of a block i is represented as Cvi.

Figure 6:
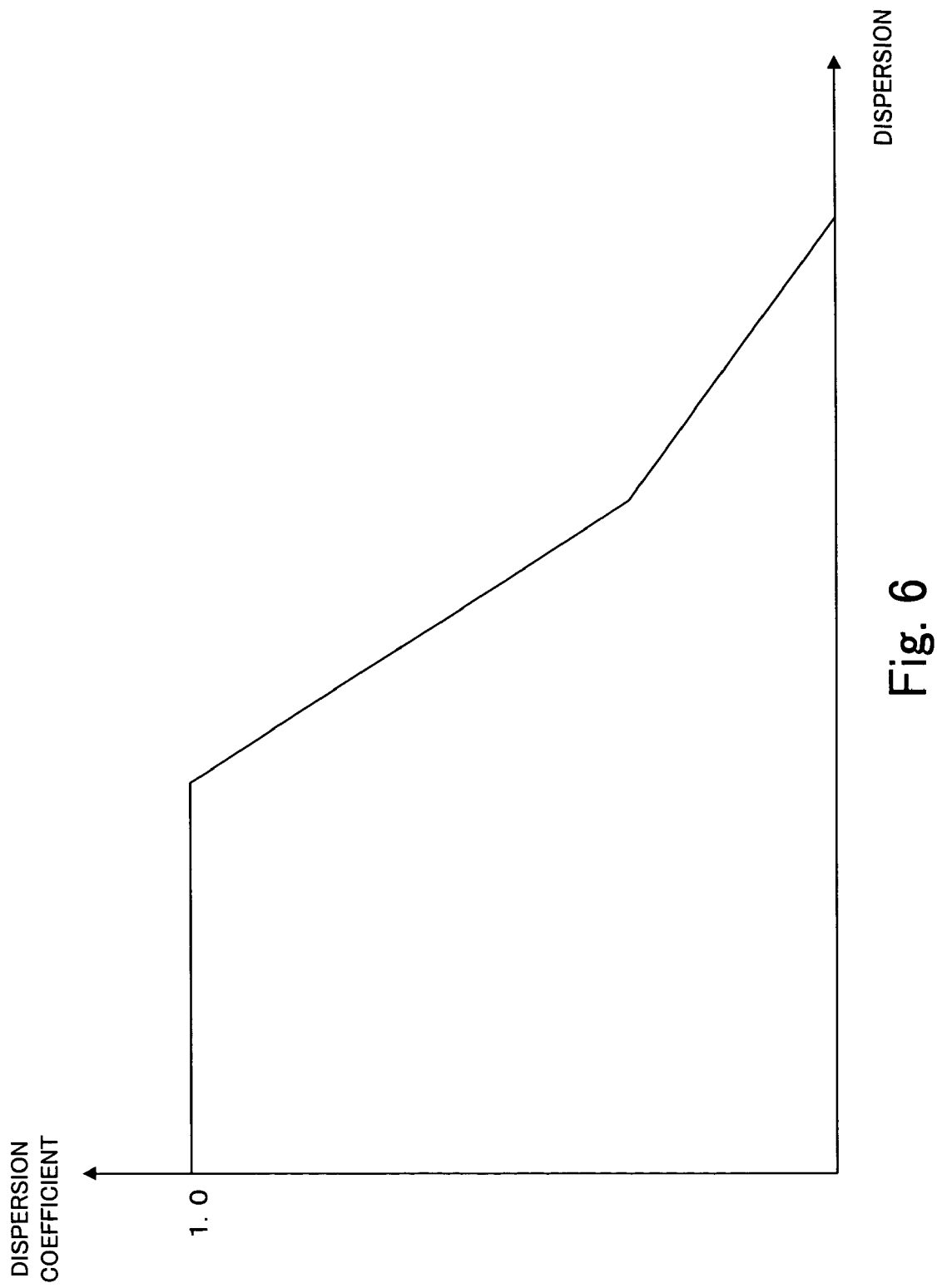
FIG. 6 is an illustration showing an example of a function for obtaining a dispersion coefficient.

The dispersion coefficient calculating circuit 111 first samples, in accordance with a predetermined method, pixels among a pixel group of a block to thereby obtain dispersion of pixel values of the sampled pixel group. In this case, the dispersion coefficient calculating circuit 111 obtains the dispersion in the pixel group sampled for each of components R, G, and B to obtain the general dispersion value by averaging dispersions of these components. Moreover, the dispersion coefficient calculating circuit 111 obtains a dispersion coefficient in accordance with a dispersion value thus obtained. The dispersion coefficient Cv is obtained by use of a prepared function. FIG. 6 is a graph showing the function. As shown in FIG. 6, the dispersion coefficient calculating circuit 111 uses a function in which, as a dispersion value increases, a dispersion coefficient corresponding to the dispersion value decreases. The function is, for example, previously entered in the dispersion coefficient calculating circuit 111.

A saturation coefficient calculating circuit 112 receives image data of each block for which the light-source reflection determination circuit 108 has determined that the typical value reflects the color of a light source, to thereby obtain a saturation coefficient Cs of the blocks. The saturation coefficient Cs is a coefficient for correcting the block reliability to be described later and is determined in accordance with the number of saturated pixels in the block. A saturated pixel denotes a pixel in which one or more components of a pixel value (for example, R, G, or B) reaches the upper limit value of the component (for example, 255 for 8-bit representation). The saturation coefficient of block i is represented as Csi.

Figure 7:
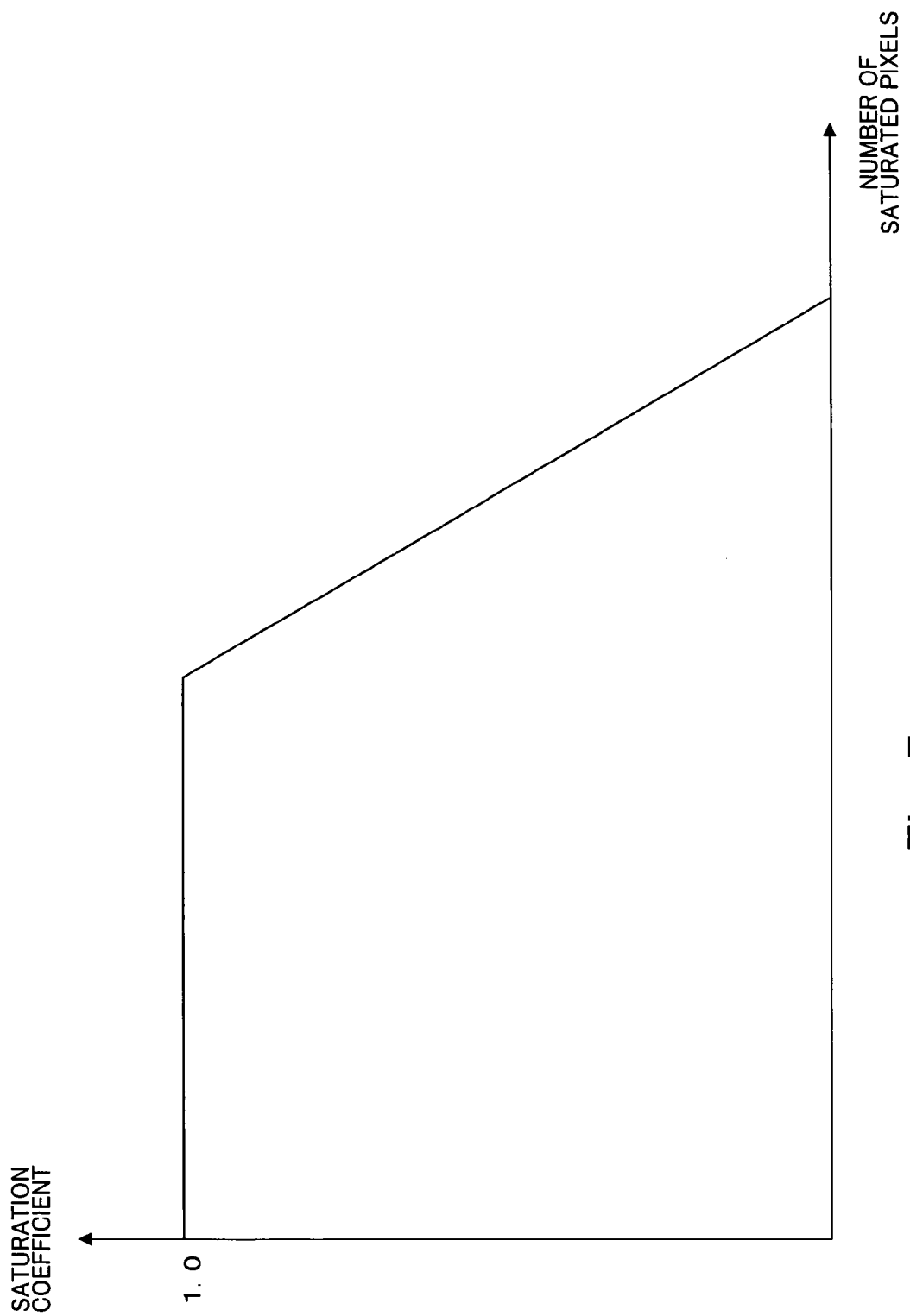
FIG. 7 is an illustration showing an example of a function for obtaining a saturation coefficient.

The saturation coefficient calculating circuit 112 first counts the number of saturated pixels in a block, and from the counting result obtains a saturation coefficient. The saturation coefficient Cs is obtained by use of a prepared function. FIG. 7 shows a graph of the function. As shown in FIG. 7, the saturation coefficient calculating circuit 112 uses a function in which, as the number of saturated pixels increases, a saturation coefficient corresponding to the number of saturated pixels decreases. A function used here is previously entered in the saturation coefficient calculating circuit 112.

The dispersion coefficient and saturation coefficient obtained by the dispersion coefficient calculating circuit 111 and saturation coefficient calculating circuit 112 are input to a reliability correcting circuit 114.

A block reliability calculating circuit 113 obtains the reliability at which each assumed light source previously illuminates a block (referred to as block reliability) for each block for which the light-source reflection determination circuit 108 has determined that the typical value reflects the color of a light source. The block reliability of a certain block is obtained for each assumed light source. This processing is described below in detail.

In the present embodiment, sunlight, tungsten light (e.g. incandescent light), and fluorescent light are assumed as light sources. These are generally used by general users as illumination light sources in still photography and video photography. Moreover, in the present embodiment, sunlight is classified into daylight (light in daytime sunshine) and shade light (light in daytime shade). Although daylight and shade are produced under the same sunlight, they differ from each other in that the former has a comparatively low color temperature (reddish) and the latter has a comparatively high color temperature (bluish). Therefore, when both daylight and shade are considered collectively, half-finished white balance which is neither sunshine nor shade may be realized. Moreover, soft control of white balance becomes difficult in a scene where sunshine and shade are mixed. Therefore, the present embodiment solves the problem by handling daylight and shade light as separate light sources. In all, in the present embodiment, four types of light sources, such as daylight, shade light, tungsten light, and fluorescent light, are assumed.

The block reliability calculating circuit 113 obtains a distance D between the color difference component of the color of a white object under each assumed light source (hereafter referred to as typical color difference of the light source) and the color difference component (u, v) of the typical value of the block. In this case, an identification number of a light source is represented as j (j=1, 2, . . . , m: m is the number of assumed light sources, and in the embodiment m=4) and a light source having an identification number j is represented as a light source j. In this case, for the sake of convenience, a light source 1 is assumed to be daylight, a light source 2 is assumed to be shade light, a light source 3 is assumed to be tungsten light, and a light source 4 is assumed to be fluorescent light. The distance Dij between the color difference component (ui, vi) of the block i and the typical color difference (Uj, Vj) of the light source j is obtained in accordance with the following expression.

$$Dij = d11*(ui-Uj)^2 + d12*(ui-Uj)*(vi-Vj) + d22*(vi-Vj)^2 \qquad (2)$$

In this case, d11, d12, and d22 are predetermined constants. By selecting a set of these constants d11, d12, and d22 in accordance with the characteristic of each assumed light source, a proper distance suitable for a light source characteristic can be defined. In this case, values of these constants are previously obtained through experiments for each assumed light source and stored in the block reliability calculating circuit 113 or memory (e.g. ROM, not illustrated) set in a camera. Moreover, for defining a distance, an expression other than the above expression (2) may be used. In such a case, there may be used a defining equation of a different distance corresponding to the characteristic of each assumed light source. Calculation of the above distance D is performed for all assumed light sources j on one block i.

Then, the block reliability calculating circuit 113 obtains a reliability Rdij when the block i is illuminated by the light source j from the obtained distance Dij. The reliability Rdij is a reliability viewed from the viewpoint of a color difference. The reliability Rdij is obtained from the distance Dij by use of a predetermined function f. Because the relation between the distance D and the reliability Rd depends on the type of a light source, the function f is preferably prepared individually for each light source j. When the reliability function for the light source j is taken as fj, the reliability Rdij when the block i is illuminated by the light source j is obtained from the following expression.

$$Rdij = fj(Dij) \qquad (3)$$

Figure 8:
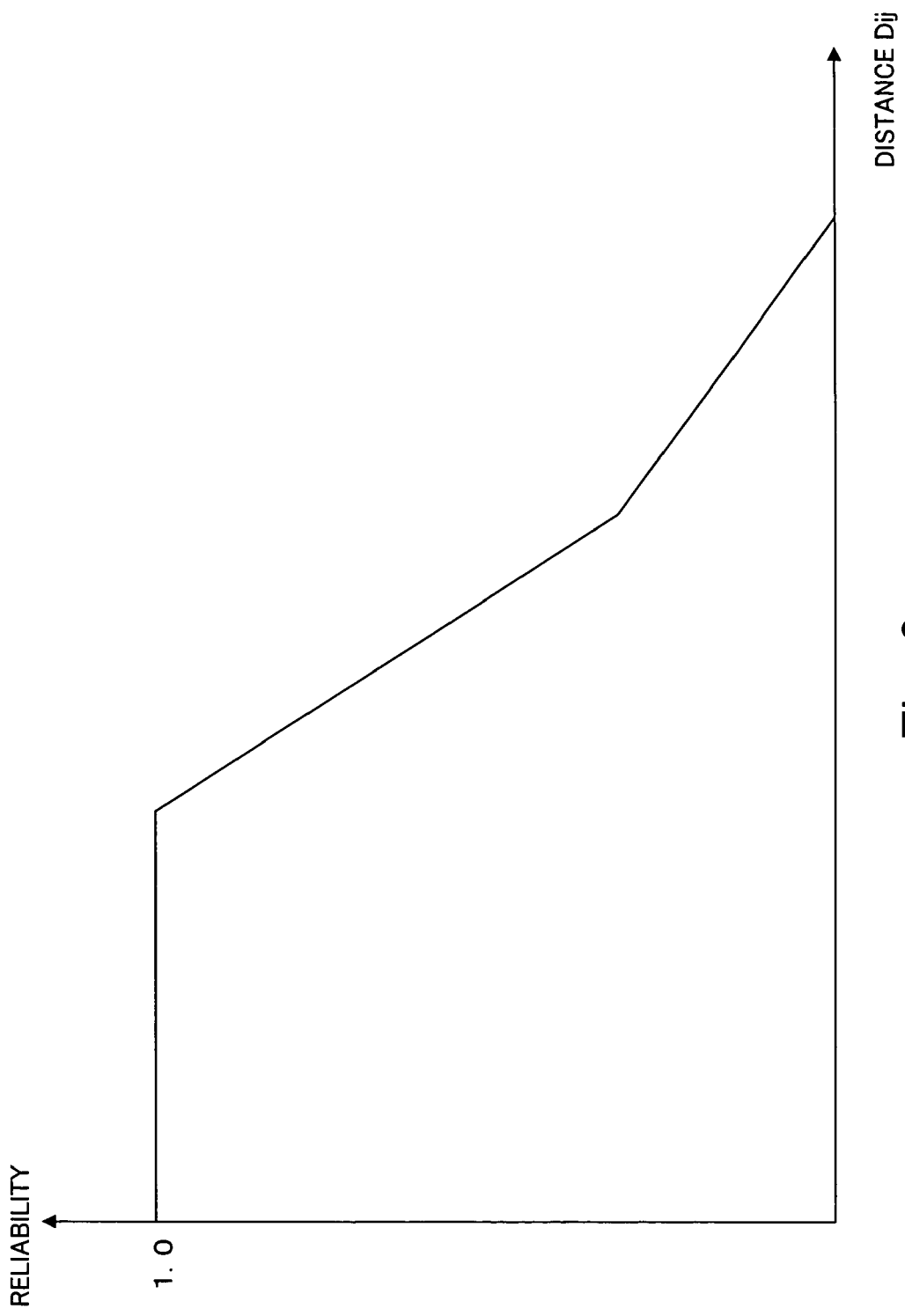
FIG. 8 is an illustration showing an example of a function for obtaining block reliability.

FIG. 8 shows an example of a reliability function fj. As shown in FIG. 8, the function fj is a function in which as the distance Dij increases, the reliability decreases. Setting the function to a function which continuously changes with a distance can avoid a problem of the prior art arising from a binary discrimination result being used as a basis of determination. The reliability function fj for each assumed light source is previously obtained from an experiment or the like and stored in an apparatus.

Moreover, the block reliability calculating circuit 113 adds to the reliability Rd correction taking into account luminance, in consideration of the color difference thus obtained. This is because the distribution of brightness of a white object under fluorescent light, the distribution of brightness of a white object under direct sunlight (daylight) and the distribution of brightness of a white object under shade differ from each other. Therefore, the probability of the block i being illuminated by the light source j can be obtained in accordance with the luminance (brightness) of the block i. In this case, the reliability Rd obtained from the previously obtained color difference is corrected by using the probability as a coefficient.

Therefore, for every block i, the block reliability calculating circuit 113 obtains a luminance coefficient Clij representing the probability that the block i is illuminated by the light source j, as determined in consideration of luminance. The luminance coefficient Clij is obtained by applying the luminance Li of the block i to a function gj predetermined for the light source j. That is, the luminance coefficient Clij is obtained from the following expression (4).

$$Clij = gj(Li) \quad (4)$$

Figure 9:
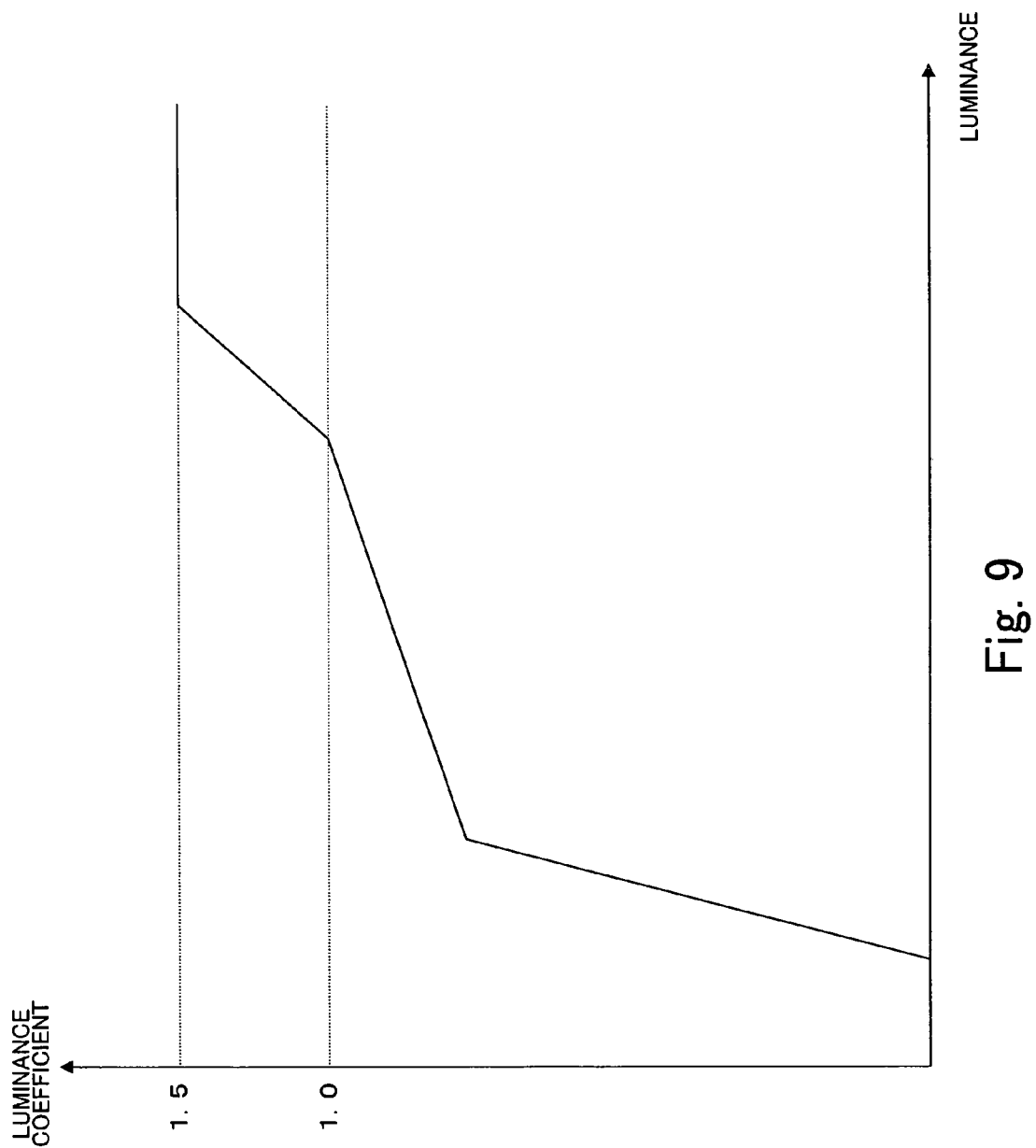
FIG. 9 is an illustration showing an example of a function for obtaining a luminance coefficient.

FIG. 9 shows an example of the function gj. The function gj is a function of the luminance Li, and this example shows that as luminance increases, a coefficient Cl increases. The function is set in this manner in consideration that a brighter object has a higher probability of being influenced by a light source. By setting the function to a function which changes continuously with luminance, the influence of the block luminance Li on white balance can be smoothed. This helps stabilize the behavior of white balance. The characteristic of a luminance coefficient depends on the type of the light source j. The luminance coefficient function gj for each light source is previously obtained from an experiment or the like and stored in an apparatus.

Then, the block reliability calculating circuit 113 obtains the reliability Rij by multiplying the reliability Rd based on a color difference by the luminance coefficient Cl. The reliability Rij is a value showing the probability that the block i is illuminated by the light source j, in consideration of both color difference and luminance. That is, the reliability Rij is obtained from the following expression (5).

$$Rij = Clij * Rdij \quad (5)$$

The block reliability calculating circuit 113 performs the above processing for all blocks i for which the light-source reflection determining circuit 108 has determined that a typical value reflects the color of a light source on all assumed light sources j. The information on the obtained reliability Rij is output to the reliability correcting circuit 114.

The reliability correcting circuit 114 corrects the reliability Rij of the light source j to the block i in accordance with the above-described dispersion coefficient Cvi and the saturation coefficient Csi on the block i, and a position coefficient Cpi determined by the position of the block i within the overall image. Specifically, by multiplying the reliability Rij by these coefficients, a reliability (referred to as correction reliability) is corrected. When the corrected reliability is taken as Rmij, Rmij is determined by the following expression (6).

$$Rmij = Cvi * Cli * Cpi * Rij \quad (6)$$

Figure 10:
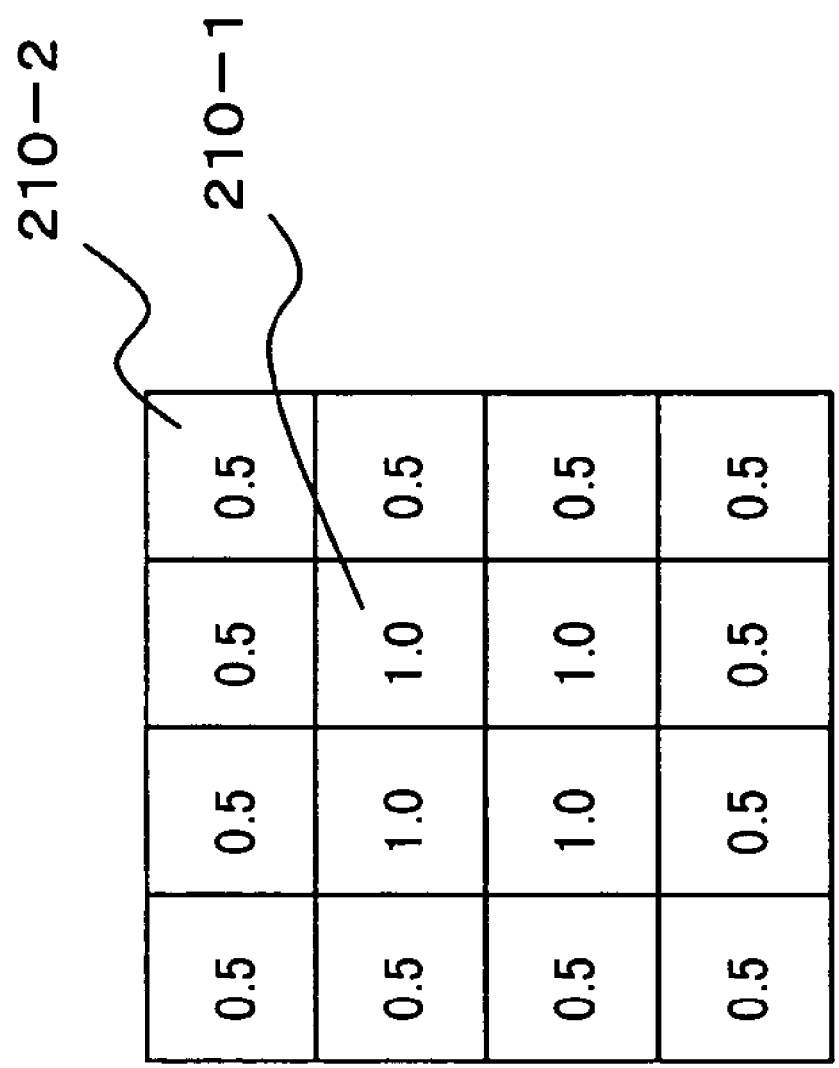
FIG. 10 is an illustration showing a setting example of a position coefficient.

In this case, the position coefficient Cpi is previously determined so that the value of the coefficient Cpi increases as the block i approaches the center of an image. This is because a block closer to the center of an image is considered to have higher importance in the image. By providing a high position coefficient for a block having high importance in consideration of position, the color of the block having high importance is strongly reflected by white balance control. FIG. 10 is an illustration showing a set example of a position coefficient. In the case of this example, 1.0 is provided as a position coefficient for a block 210-1 at the center portion of an image and 0.5 is provided as a position coefficient for a block 210-2 at the marginal portion of the image. These position coefficients are previously stored in an apparatus.

Moreover, this correction processing also considers the dispersion coefficient Cvi and saturation coefficient Csi. This has the following significance.

First, the dispersion coefficient Cvi is determined such that as the dispersion of a pixel value in the block i increases, the value decreases. Therefore, as the dispersion of the block i increases, the dispersion coefficient Cvi decreases. As a result, the value of the correction reliability Rmij also decreases. This correction is performed because, as the dispersion of the pixel value of the block i increases, the reliability Rij obtained from the typical value (Li, ui, vi) of the block is considered to be of lower reliability. As the dispersion increases, fluctuation of each pixel value in the block is considered to increase. Therefore, the typical value obtained from the pixel value is considered to have a low probability of showing the trend of the color of the block (that is, trend of illumination). Therefore, because the reliability Rij obtained from the typical value having a low reliability is considered to have low reliability, the value of the dispersion coefficient Cvi is decreased in order to decrease the influence of the reliability Rij on white balance.

Moreover, as described previously, the value of the saturation coefficient Csi decreases as the number of saturated pixels in the block i increases. Therefore, as the number of saturated pixels in the block i increases, the saturation coefficient Csi decreases, and as a result, the reliability Rij is corrected to a small value. This correction is performed, in consideration that the reliability of the reliability Rij obtained from the typical value (Li, ui, vi) of the block is low. In the case of a saturated pixel, because a portion exceeding the upper limit value of each of RGB components may be cut, the correct color of an object may fail to be shown. Therefore, as the number of saturated pixels increases, the probability that the typical value of a block shows the trend of the color of the block (therefore, trend of illumination) is considered to lower. Because the reliability of the reliability Rij obtained from the typical value having a low reliability is considered to be low, the value of the saturation coefficient Csi is decreased in order to decrease the influence of the reliability Rij on white balance.

The reliability correcting circuit 114 performs execution for all blocks i for which the light-source reflection determination circuit 108 has determined that the typical value reflects the color of a light source on all assumed light sources j. The obtained corrected reliability Rmij is input to a general reliability calculating circuit 115 and a light-source contribution calculating circuit 116.

The general reliability calculating circuit 115 calculates a reliability Rtj of the whole image of the light source j (referred to as general reliability). The general reliability calculating circuit 115 obtains a general reliability Rtij by totaling the corrected reliability Rmij of each block i for the blocks for which the light-source reflection determination circuit 108 has determined that the typical value reflects the color of a light source. That is:

$$Rtj = \Sigma Rmij \text{ (In this case, } \Sigma \text{ denotes the total for } i=1 \text{ to } n) \quad (7)$$

The light-source contribution calculating circuit 116 estimates the reliability of each light source i and the contribution component of each light source j to the whole image, on the whole scene of an image. The light-source contribution component of the light source j denotes the influence of the whole image on tint by each light source j. In other words, the component is a trend of a color which is estimated as appearing on the image by illuminating the scene of the image by the light source j. A light-source contribution component is shown by a set consisting of luminance and color difference. In this case, the contribution component of the light source j to the whole image is represented as (Lcj, ucj, vcj).

The light-source contribution calculating circuit 116 estimates a light-source contribution component in accordance with the following expression in terms of the corrected reliability Rmij to each assumed light source j, typical values (Li, ui, vi) of each block, and general reliability Rtj of each light source for each block for which the light-source reflection determination circuit 108 has determined that the typical value reflects the color of a light source.

$$Lcj = \frac{\sum Rmij \cdot Li}{Rtj}$$

$$ucj = \frac{\sum Rmij \cdot ui}{Rtj} \quad (8)$$

$$vcj = \frac{\sum Rmij \cdot vi}{Rtj}$$

In expression (8), $\Sigma$ indicates the total for i=1 to n (n denotes the total number of blocks for which the light-source reflection determination circuit 108 has determined that the typical value reflects the color of a light source). This calculation is equivalent to processing for weight-averaging the luminance and color difference of each block i by the corrected reliability Rmij of each block i on all blocks for which the light-source reflection determination circuit 108 has determined that the typical value reflects the color of a light source.

A light-source contribution correcting circuit 117 corrects an estimated value for which the contribution component of each light source j to the whole scene of the input image is estimated as described above. This correction is roughly divided into two stages.

In the first stage, the contribution component of each light source j and a standard color predetermined for each assumed light source j are weight-averaged. The standard color of the light source j is a standard color of a scene under the illumination of the light source j (that is, a set consisting of luminance and color difference). This is obtained by previously photographing various scenes by use of the light source j and aggregating luminances and color differences of photographed images. The standard color (Lsj, usj, vsj) of each light source j is previously stored in an apparatus. The correction processing of this first stage is represented by the following expression.

$$Lmj = wsj \cdot Lcj + (1-wsj) \cdot Lsj \; umj = wsj \cdot ucj + (1-wsj) \cdot usj$$
$$vmj = wsj \cdot vcj + (1-wsj) \cdot vsj \quad (9)$$

In this case, (Lmj, umj, vmj) is a corrected result of a contribution component and wsj (in this case, $0 \leq wsj \leq 1$) is a predetermined weight. The weight wsj is previously obtained for each light source j through experiments or the like and stored in an apparatus.

The correction of the first stage is correction for reducing the influence of an object color included in a light-source contribution component (Lcj, ucj, vcj). A color appearing on an image is influenced by the color of illumination light (illumination color) from a light source and the color of the object (object color). White balance is performing color correction so that a white object is seen as white in accordance with the color temperature of illumination light. Therefore, when the color of the illumination light can be accurately estimated, accurate white balance adjustment can be performed. However, most actual images are those in which a photographed scene includes many objects of colors other than white and object colors influence colors of images. Weight-averaging a light-source contribution component and the standard color of the light source j enables a relative reduction in the influence of an object color included in the light-source contribution component and correction of the light-source contribution component to a value closer to the color of illumination.

In the second stage, correction considering the luminance of an object is added to the correction result (Lmj, umj, vmj) of the first stage. Object luminance Lo is detected by an object luminance detector 30 set to a camera. In the case of the correction in the second stage, the light-source contribution correcting circuit 117 first individually obtains a correction coefficient Coj for each light source j. The correction coefficient Coj is obtained by applying the object luminance Lo to a function hj individually prepared for each light source j. That is:

$$Coj = hj(Lo) \quad (10)$$

Figure 11:
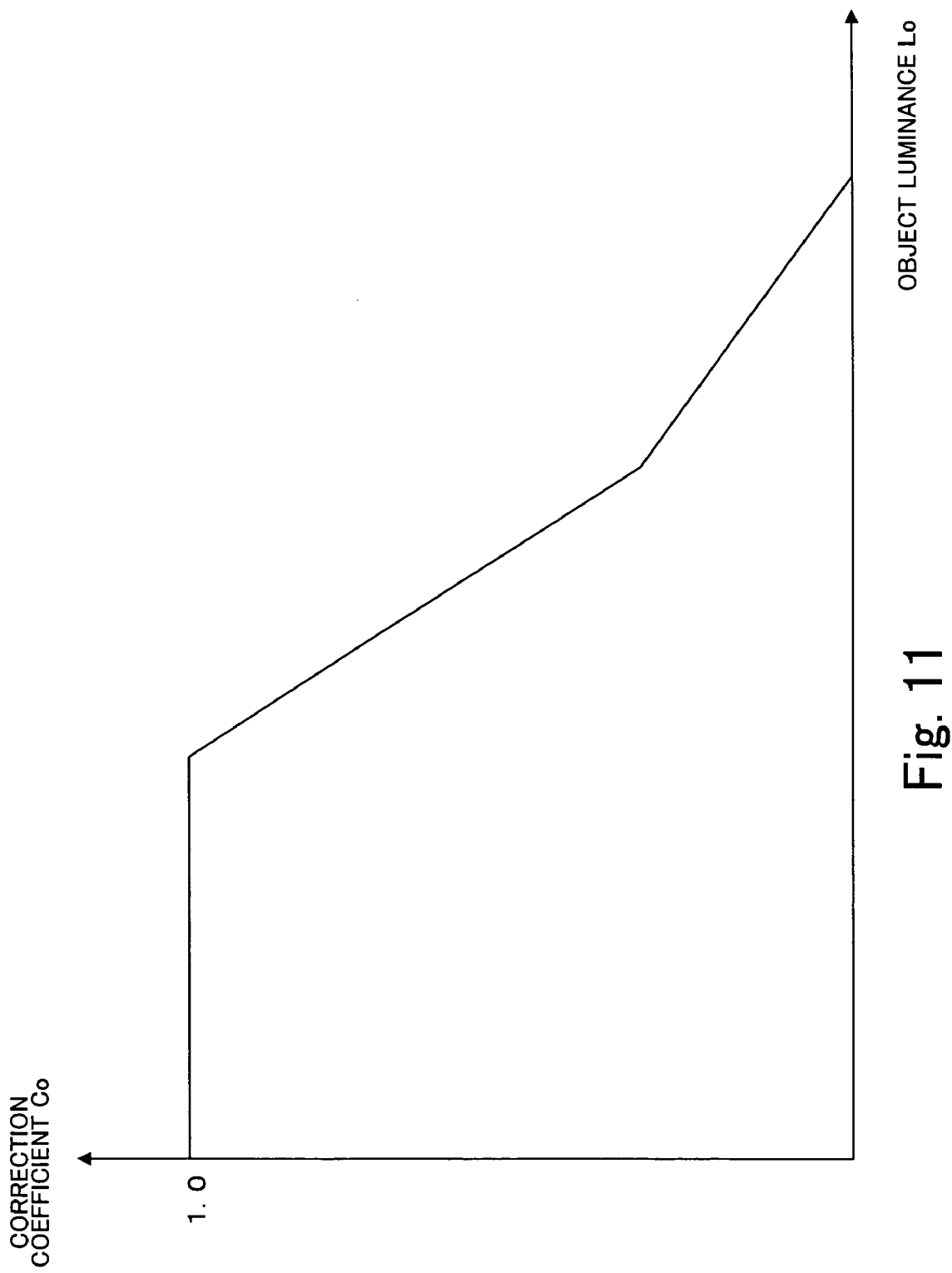
FIG. 11 is an illustration showing an example of a function for obtaining a correction coefficient from object luminance.

FIG. 11 shows an example of the correction coefficient hj according to object luminance. In the case of this example, as the object luminance Lo increases, a correction coefficient Co decreases. When the object luminance exceeds a certain value, the correction coefficient becomes 0. This is an example of the function hj when a light source is a fluorescent lamp. When a photographed scene is under fluorescent illumination, an object is dark as compared with a case in which a scene is daytime outdoors. When the object luminance is very large, an image has a high probability of being a photograph of an outdoor scene but has a low probability of being taken under fluorescent illumination. Therefore, in the case of a fluorescent light source, as object luminance rises, the correction coefficient Co becomes smaller. Also in the case of a scene photographed under tungsten light or shade light, object luminance is considered to be low in comparison to a daylight scene. Therefore, there is used a function hj in which, when object luminance exceeds a certain value, the correction coefficient Co decreases. These correction functions hj are previously obtained through experiments or the like and stored in an apparatus.

Then, the light-source contribution correcting circuit 117 obtains a final correction result (Lzj, uzj, vzj) by multiplying the correction result (Lmj, umj, vmj) obtained in the first stage by the thus-obtained correction coefficient Co. That is:

$$Lzi = Coj \cdot Lmjuzi = coj \cdot umjvzi = Coj \cdot vmj \quad (11)$$

The correction result (Lzj, uzj, vzj) becomes a light-source contribution component corrected in consideration of a parameter such as object luminance. The correction result is output to an illumination color estimating circuit 118.

The illumination color estimating circuit 118 estimates the color of illumination (illumination color) for illuminating a photographing scene of the image concerned in accordance with the correction result (Lzj, uzj, vzj) of the light-source contribution component of each light source j input from the light-source contribution correcting circuit 117 and general reliability Rtj of each light source j to the whole scene obtained by the general reliability calculating circuit 115. This estimation is performed by using the correction result (Lzj, uzj, vzj) of the light-source contribution component of each light source j as a weight and thereby weight-averaging all assumed light sources. That is, when an illumination color is taken as (IL, Iu, IV), in the following expression (12) Σ denotes the total for all assumed light sources j.

$$Wj = \frac{Rtj}{\sum Rtj} \quad (12)$$

$$IL = \sum (Wj * Lzj)$$

$$Iu = \sum (Wj * uzj)$$

$$Iv = \sum (Wj * vzj)$$

That is, under an assumption that scenes are complexly illuminated by the assumed light sources j, the illumination color estimating circuit 118 estimates the color of the complex illumination in accordance with weight averaging. The illumination color corresponds to the color of a white object under the complex illumination. The obtained illumination color (IL, Iu, Iv) is input to the white balance gain calculating circuit 120.

The white balance gain calculating circuit 120 calculates gains for white balance adjustment (Rgain, Ggain, Bgain) in accordance with the information on the received illumination color (IL, Iu, Iv). This calculation is performed in accordance with the following expression.

$$\begin{pmatrix} IR \\ IG \\ IB \end{pmatrix} = \begin{pmatrix} 1 & -1 & -1 \\ 1 & 1 & 0 \\ 1 & -1 & 1 \end{pmatrix} \begin{pmatrix} IL \\ Iu \\ Iv \end{pmatrix} \quad (13)$$

$$I\text{Max} = \max(IR, IG, IB) \quad (14)$$

$$R\text{gain} = I\text{Max}/IR, \ G\text{gain} = I\text{Max}/IG, \ B\text{gain} = I\text{Max}/IB \quad (15)$$

(IR, IG, IB) is RGB expression of an illumination color. White balance gains to be obtained (Rgain, Ggain, Bgain) become values for correcting the color when the illumination of this color is reflected by a white object (that is, (IR, IG, IB)) to gray; that is, R=G=B. The obtained white balance gain is input to the white balance adjusting circuit 130.

<White Balance Adjusting Circuit>

The white balance adjusting circuit 130 adjusts the white balance of an image input from the image pickup device 20 by multiplying each pixel value R, G, and B of the image by gains Rgain, Ggain, and Bgain, respectively, obtained from the white balance gain calculating circuit 120. Therefore, outputs (Rout, Gout, Bout) obtained from the following expression are output from an output terminal 140 of the auto white balance apparatus 10.

$$R\text{out} = R\text{gain}*R, \ G\text{out} = G\text{gain}*G, \ B\text{out} = B\text{gain}*B \quad (16)$$

Figure 12:
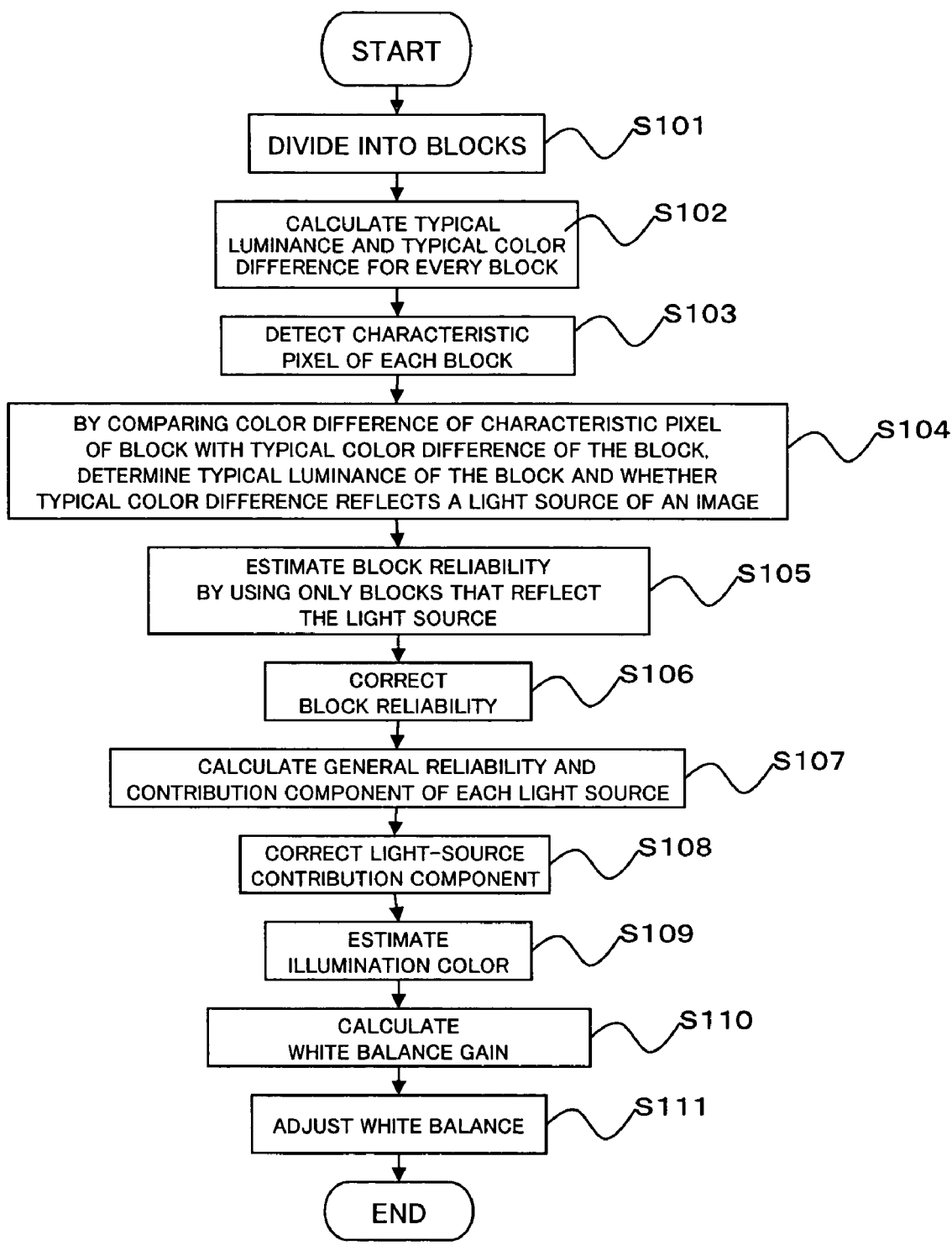
FIG. 12 is an illustration showing processing performed by the auto white balance apparatus in the embodiment.

Next, the procedure of the processing performed by the auto white balance apparatus 10 constituted as described above will be described by reference to the flowchart in FIG. 12.

First, the block-dividing circuit 102 divides an image signal output from the image pickup device 20 into predetermined blocks (S101). Then, the typical-value calculating circuit 104 calculates typical luminance and typical color difference for every block (S102), and the characteristic pixel detecting circuit 106 detects, for every block, a characteristic pixel from among a pixel group constituting the block (S103). The light-source reflection determination circuit 108 compares the color difference (u0, v0) of a characteristic pixel extracted by the characteristic pixel detecting circuit 106 with the typical color difference (u1, v1) corresponding to the characteristic pixel, to thereby determine whether the typical luminance and typical color difference of each block obtained by the typical value calculating circuit 104 reflect the color of a light source (S104).

Then, the block reliability calculating circuit obtains the reliability Rij when each assumed light source illuminates each block for which the light-source reflection determination circuit has determined that the typical value reflects the color of a light source (S105). Moreover, the reliability correcting circuit 114 corrects the reliability Rij in accordance with the dispersion coefficient Cvi, the saturation coefficient Csi, and the position coefficient Cpi (S106). Then, the reliability of each light source j and the contribution component of each light source j to the whole image are estimated by the general reliability calculating circuit 115 and the light-source contribution calculating circuit 116 (S107) and moreover, the light-source contribution correcting circuit 117 corrects a contribution component of each light source j to the whole image (S108).

Then, the illumination color estimating circuit 118 estimates the color of the illumination (illumination color) for illuminating photographed scenes of the image concerned in accordance with the correction result (Lzj, uzj, vzj) of the light-source contribution component of each light source j input from the light-source contribution correcting circuit 117 and the general reliability Rtj of each light source j to the whole scene obtained by the general reliability calculating circuit 115 (S109). The white balance gain calculating circuit 120 calculates gains (Rgain, Ggain, Bgain) for adjusting white balance in accordance with the information on the illumination color (IL, Iu, Iv) obtained by the illumination color estimating circuit 118 (S110), and the white balance adjusting circuit 130 adjusts the white balance of an image input from the image pickup device 20 by multiplying each pixel value R, G, and B of the image by the gains Rgain, Ggain, and Bgain, respectively, obtained by the white balance gain calculating circuit 120 (S111).

As described above, according to the embodiment, only the data for blocks selected by the light-source reflection determination circuit 108 among a block group divided and obtained by the block-dividing circuit 102 are input to the dispersion coefficient calculating circuit 111, the saturation coefficient calculating circuit 112, and the block reliability calculating circuit 113, and the light source of an input image is estimated. Therefore, the light source can be more accurately estimated according to the typical luminance and typical color difference of a block, and more stable white balance adjustment can be performed.

Figure 13:
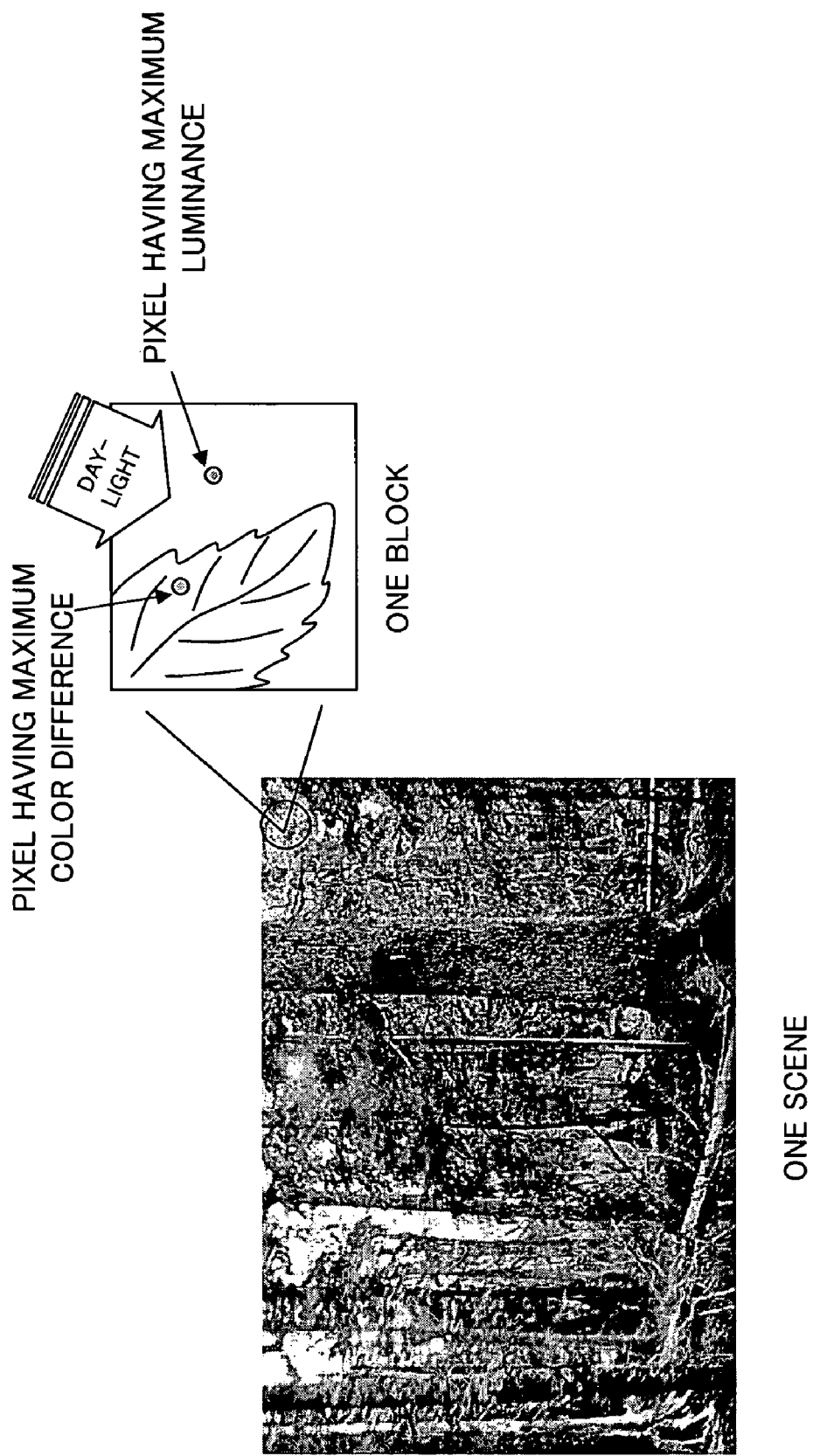
FIG. 13 is an illustration showing an example of a block when a light source may be determined as being other than daylight but may be erroneously determined as a fluorescent lamp.

When average values of luminances and color differences of each pixel in a block are simply used as the typical luminance and typical color difference of the block to determine a light source, the light source of a scene of a forest including many comparatively dark and green objects may be erroneously determined as not daylight but a fluorescent lamp, because the color difference component of green and color difference component of the fluorescent lamp have values that are comparatively close to each other when a light source is determined. FIG. 13 is an example of a block in which a light source is not determined as daylight but is erroneously determined as a fluorescent lamp. In the case of this scene, the color of an object (green of leaves in this case) and the background (sky color in this case) are averaged and the light source of the block may be erroneously determined as a fluorescent lamp.

However, in the case of the block shown in FIG. 13, the light-source reflection determination circuit 108 determines that an angle θ formed between vectors of the color difference (u0, v0) of a pixel having the maximum luminance and typical color difference (u1, v1) of the block is large and the scalar ratio R is close to 1. Moreover, the circuit 108 determines that an angle θ formed between vectors of the color difference (u0, v0) of a pixel having the maximum color difference and the typical color difference (u1, v1) of the block is small and the scalar ratio R is close to 1. Therefore, because the light-source reflection determination circuit 108 determines that the block is a block from which a light source is not reflected and cancels it, the block is not used when estimating the light source of an input image. Therefore, it is possible to reduce the risk of determining the above scene as not daylight but a fluorescent lamp.

What is claimed is:

1. An auto white balance apparatus comprising:
   block-dividing means for dividing an input image into a plurality of blocks;
   typical-value calculating means for calculating, for every block, a typical value including luminance and color difference representing a block in accordance with each color value in the block;
   characteristic pixel determination means for determining, for every block, a characteristic pixel from a pixel group constituting the block;
   light-source reflection determination means for determining, for every block, whether the typical value of the block reflects a light source of the input image, by comparing a typical color difference of the block with a color difference of a characteristic pixel of the block;
   white balance evaluating means for estimating the color of the light source of the input image in accordance with the typical luminance and the typical color difference of the block for which the light-source reflection determination means determines that the block reflects the light source and the object luminance of the input image;
   white balance gain calculating means for calculating a white balance gain to be applied to the input image in accordance with the estimated light-source color;
   white balance adjusting means for adjusting the white balance to the input image by use of the calculated white balance gain; and
   the characteristic pixel determination means determines as a characteristic pixel of the block a pixel having the highest luminance from among a pixel group constituting the block.

2. An auto white balance apparatus comprising:
   block-dividing means for dividing an input image into a plurality of blocks;
   typical-value calculating, means for calculating, for every block, a typical value including luminance and color difference representing a block in accordance with each color value in the block;
   characteristic pixel determination means for determining, for every block, a characteristic pixel from a pixel group constituting the block;
   light-source reflection determination means for determining, for every block, whether the typical value of the block reflects a light source of the input image, by comparing a typical color difference of the block with a color difference of a characteristic pixel of the block;
   white balance evaluating means for estimating the color of the light source of the input image in accordance with the typical luminance and the typical color difference of the block for which the light-source reflection determination means determines that the block reflects the light source and the object luminance of the input image;
   white balance gain calculating means for calculating a white balance gain to be applied to the input image in accordance with the estimated light-source color;
   white balance adjusting means for adjusting the white balance to the input image by use of the calculated white balance gain; and
   the characteristic pixel determination means determines as a characteristic pixel of the block a pixel having the largest color difference from among a pixel group constituting the block.

3. An auto white balance apparatus comprising:
   block-dividing means for dividing an input image into a plurality of blocks;
   typical-value calculating means for calculating, for every block, a typical value including luminance and color difference representing a block in accordance with each color value in the block;
   characteristic pixel determination means for determining, for every block, a characteristic pixel from a pixel group constituting the block;
   light-source reflection determination means for determining, for every block, whether the typical value of the block reflects a light source of the input image, by comparing a typical color difference of the block with a color difference of a characteristic pixel of the block;
   white balance evaluating means for estimating the color of the light source of the input image in accordance with the typical luminance and the typical color difference of the block for which the light-source reflection determination means determines that the block reflects the light source and the object luminance of the input image;
   white balance gain calculating means for calculating a white balance gain to be applied to the input image in accordance with the estimated light-source color;
   white balance adjusting means for adjusting the white balance to the input image by use of the calculated white balance gain; and
   the light-source reflection determination means determines whether the typical value of the block reflects the color of the light source, in accordance with an angle θ formed between a vector T0 connecting the typical color difference of the block with the origin of a color difference space and a vector T1 connecting the color difference of a characteristic pixel of the block with the origin of the color difference space, and a scalar ratio R between the vector T0 and the vector T1.

4. The auto white balance apparatus according to claim 3, wherein:
   the light-source reflection determination means determines that the typical value of the block reflects the color of the light source when the pixel having the highest luminance is a characteristic pixel and conditions of cos $\theta > \alpha$ ($\alpha$:constant) and $\beta_1 < R < \beta_2$ ($\beta_1$ and $\beta_2$ are constants) are satisfied.

5. The auto white balance apparatus according to claim 3, wherein:
the light-source reflection determination means determines that the typical value of the block does not reflect the color of the light source when a pixel having the largest color difference is a characteristic pixel and conditions of cos $\theta > \alpha$ ($\alpha$:constant) and $\beta_3 < R < \beta_4$ ($\beta_3$ and $\beta_4$ are constants) are satisfied.

6. A white balance adjusting method for performing white balance adjustment for a picked-up image, comprising:
a block-dividing step of dividing an input image into a plurality of blocks;
a typical value calculating step of calculating, for every block, a typical value including luminance and color difference representing a block in accordance with each color value in the block;
a characteristic pixel determination step of determining, for every block, a characteristic pixel from a pixel group constituting the block;
a light-source reflection determination step of determining, for every block, whether the typical value of the block indicates reflection of a light source of the input image, by comparing a typical color difference of the block with a color difference of a characteristic pixel of the block;
a white balance evaluating step of estimating the color of the light source of the image in accordance with a typical luminance of the block for which, in the light-source reflection determination step, a determination is made that the block reflects the light source, and the object luminance of the input image;
a white balance gain calculating step of calculating a white balance gain to be applied to the input image in accordance with the estimated color of the light source;
a white balance adjusting step of adjusting the white balance for the input image by using the calculated white balance gain; and
in the characteristic pixel determination step, a pixel having the highest luminance is determined from among the pixel group constituting the block as the characteristic pixel in the block.

7. A white balance adjusting method for performing white balance adjustment for a picked-up image, comprising:
a block-dividing step of dividing an input image into a plurality of blocks;
a typical value calculating step of calculating, for every block, a typical value including luminance and color difference representing a block in accordance with each color value in the block;
a characteristic pixel determination step of determining, for every block, a characteristic pixel from a pixel group constituting the block;
a light-source reflection determination step of determining, for even block, whether the typical value of the block indicates reflection of a light source of the input image, by comparing a typical color difference of the block with a color difference of a characteristic pixel of the block;
a white balance evaluating step of estimating the color of the light source of the image in accordance with a typical luminance of the block for which, in the light-source reflection determination step, a determination is made that the block reflects the light source, and the object luminance of the input image;
a white balance gain calculating step of calculating a white balance gain to be applied to the input image in accordance with the estimated color of the light source;
a white balance adjusting step of adjusting the white balance for the input image by using the calculated white balance gain; and
in the characteristic pixel determination step, a pixel having the largest color difference is detected from the pixel group constituting the block as a characteristic pixel of the block.

8. A white balance adjusting method for performing white balance adjustment for a picked-up image, comprising:
a block-dividing step of dividing an input image into a plurality of blocks;
a typical value calculating step of calculating for every block, a typical value including luminance and color difference representing a block in accordance with each color value in the block;
a characteristic pixel determination step of determining, for every block, a characteristic pixel from a pixel group constituting the block;
a light-source reflection determination step of determining, for every block, whether the typical value of the block indicates reflection of a light source of the input image, by comparing a typical color difference of the block with a color difference of a characteristic pixel of the block;
a white balance evaluating step of estimating the color of the light source of the image in accordance with a typical luminance of the block for which, in the light-source reflection determination step, a determination is made that the block reflects the light source, and the object luminance of the input image;
a white balance gain calculating step of calculating a white balance gain to be applied to the input image in accordance with the estimated color of the light source;
a white balance adjusting step of adjusting the white balance for the input image by using the calculated white balance gain; and
in the light-source reflection determination step, for every block a determination is made as to whether the typical value of the block indicates reflection of the color of a light source, in accordance with an angle $\theta$ formed between a vector T0 connecting the typical color difference of the block with the origin of a color difference space and a vector T1 connecting the color difference of the characteristic pixel of the block with the origin of the color difference space, and a scalar ratio R between the vector T0 and the vector T1.

9. The white balance adjusting method according to claim 8, wherein:
in the light-source reflection determination step, a determination is made that the typical value of the block reflects the color of the light source when a pixel having the largest color difference is the characteristic pixel and conditions of cos $\theta > \alpha$ ($\alpha$:constant) and $\beta_1 < R < \beta_2$ ($\beta_1$ and $\beta_2$ are constants) are satisfied.

10. The white balance adjusting method according to claim 8, wherein:
in the light-source reflection determination step, a determination is made that the typical value of the block does not reflect the color of the light source when a pixel having the largest color difference is the characteristic pixel and conditions of cos $\theta > \alpha$ ($\alpha$:constant) and $\beta_3 < R < \beta_4$ ($\beta_3$ and $\beta_4$ are constants) are satisfied.

* * * * *

UNITED STATES PATENT AND TRADEMARK OFFICE
CERTIFICATE OF CORRECTION

PATENT NO.       : 7,705,892 B2                                              Page 1 of 1
APPLICATION NO.  : 11/256530
DATED            : April 27, 2010
INVENTOR(S)      : Tetsuji Uezono It is certified that error appears in the above-identified patent and that said Letters Patent is hereby corrected as shown below:

| Issued Patent | | Description of Error |
| Column | Line | |
|---|---|---|
| 15 | 64 | In Claim 2, delete "calculating," and insert -- calculating -- |
| 17 | 13 | In Claim 6, delete "comprising;" and insert -- comprising: -- |
| 17 | 57 (Approx.) | In Claim 7, delete "even" and insert -- every -- |
| 18 | 15 | In Claim 8, delete "calculating" and insert -- calculating, -- |

Signed and Sealed this

Twenty-first Day of September, 2010

David J. Kappos
*Director of the United States Patent and Trademark Office*